United States Patent [19]

Spiegel et al.

[11] Patent Number: 4,511,183
[45] Date of Patent: Apr. 16, 1985

[54] STEEL WHEEL WITH DECORATIVE COVER

[75] Inventors: Martin A. Spiegel; Franklin D. Roberts, both of Compton, Calif.

[73] Assignee: Mr. Gasket Company, Cleveland, Ohio

[21] Appl. No.: 512,771

[22] Filed: Jul. 11, 1983

[51] Int. Cl.³ .............................. B60B 7/02; B60B 7/06
[52] U.S. Cl. ................................. 301/37 S; 301/108 R
[58] Field of Search ............ 301/37 R, 37 CM, 37 TP, 301/37 S, 37 SC, 108 R, 108 S, 108 SC, 378

[56] References Cited

U.S. PATENT DOCUMENTS

| 1,378,877 | 5/1921 | Lachman . | |
|---|---|---|---|
| 1,477,915 | 12/1923 | Seymour . | |
| 1,573,238 | 2/1926 | Forsyth . | |
| 1,854,728 | 4/1932 | Baker . | |
| 2,584,452 | 2/1952 | Horn | 301/37 R |
| 2,650,135 | 8/1953 | Lyon | 301/37 S |
| 3,214,220 | 10/1965 | Foster et al. . | |
| 3,554,535 | 1/1971 | Gerry . | |
| 3,669,501 | 6/1972 | Derleth | 301/37 R |
| 3,726,566 | 4/1973 | Beith | 301/37 R |
| 3,756,658 | 9/1973 | Adams | 301/37 R |
| 3,767,267 | 10/1973 | Clement | 301/63 R |
| 3,859,704 | 1/1975 | Nasson | 301/63 R |
| 4,094,550 | 6/1978 | Toal et al. | 301/37 R |
| 4,221,435 | 9/1980 | Hamada et al. | 301/37 SC X |
| 4,316,637 | 2/1982 | Reynolds et al. | 301/37 R |

FOREIGN PATENT DOCUMENTS

| 2301395 | 2/1975 | France | 301/37 R |
| 429258 | 5/1935 | United Kingdom | 301/37 SC |

Primary Examiner—David A. Scherbel
Attorney, Agent, or Firm—Roylance, Abrams, Berdo & Goodman

[57] ABSTRACT

A wheel assembly for a vehicle has a metal decorative cover extending over the wheel center of a conventional steel wheel. The outer periphery of the cover extends around the junction between the wheel center and the well of the steel wheels's rim. The cover has stud holes which register with those of the steel wheel, and is clamped to the wheel center by the wheel mounting studs and nuts of the vehicle. The cover is spaced from the wheel center between the periphery of the cover and the stud holes which are preferably recessed in the cover. Reinforcing members may bridge the space between the cover and the wheel center. Preferably, the outer periphery of the cover is formed as a lip curved into the joint of the rim and center. Different covers can be interchanged on the wheel to change the appearance thereof.

18 Claims, 8 Drawing Figures

STEEL WHEEL WITH DECORATIVE COVER

FIELD OF THE INVENTION

This invention relates to decorative covers for steel wheels.

BACKGROUND OF THE INVENTION

Conventional steel wheels for automobiles are relatively inexpensive, but generally do not have an aesthetically pleasing appearance, and can detract from the appearance of the automobile. To conceal the mounting studs and nuts, painted or chromed hub caps have been snap fitted over the central hub portion of the wheel. While these make some improvement to the appearance of the wheel, their big disadvantage is that they are readily detachable and can easily be stolen or inadvertently come off during operation of the vehicle.

During more recent years, so called non-ferrous "mag" wheels have become more popular, and apart from any technical and performance reasons, these "mag" wheels have become a prestige symbol and are considered by many to add class and distinction to a vehicle. However, such wheels are considerably more expensive than standard steel wheels.

In an attempt to improve the appearance of standard steel wheels, give them more distinctiveness and prestigeous appeal, and yet keep the cost below that of genuine "mag" wheels, several approaches have been tried or suggested.

One of these suggestions has been to mold a decorative plastic overlay on the outboard side of the wheel and finish this overlay to appear like metal. There are several disadvantages to this approach. These concern the inconvenience and cost of handling the steel wheels during the molding process; the thickness of the plastic necessary to obtain some outboard contours and appearances, particularly if a "mag" wheel shape is intended; and the damage the surface of the plastic overlay can sustain during handling, for example during tire changing. However, a main disadvantage is that once the wheel has been manufactured, its shape and appearance cannot be changed. Consequently, if a number of different shapes and appearances are in demand, as they usually are, then it is necessary for the manufacturer and distributor to stock all these different shapes. Apart from increasing the inventory of wheels required, this also has the effect of limiting the number of optimal shapes and appearances that are available.

Another proposal has been to provide an imitation "mag" wheel by applying a thin decorative cover over the entire outboard side of a conventional steel wheel, including the tire supporting rim, and securing the cover in place by engaging its outer periphery over the outer periphery of the tire supporting rim and clamping the central portion to the wheel center by means of the wheel mounting studs and nuts. Although this would appear to be a fairly inexpensive approach to improving the appearance and appeal of a conventional steel wheel, it still has some shortcomings. Firstly, the cover would tend to be permanently attached to the steel wheel and could not easily be changed. Secondly, the outer periphery portion of the cover, engaging over the periphery of the tire rim, would risk getting damaged during tire mounting and changing operations. Thirdly, this same decorative portion would be exposed to damage during vehicle operation if, for example, the wheel scraped against a curb or the like. And, fourthly, it would appear necessary to have the cover nest fairly closely to the outboard contour of the wheel center, so placing a limitation on the types of contours and appearances that could be obtained.

SUMMARY OF THE INVENTION

An object of the present invention is to provide an improved cover for a conventional type steel wheel which avoids or reduces the disadvantages mentioned above.

A feature by which this is achieved is by locating the outer peripheral edge of the cover in the junction on the outboard side between the tire rim and the wheel center, and retaining the cover in place by the wheel mounting studs and nuts. This has the advantages that the periphery of the cover is protected by the tire rim, location in the junction between the tire rim and the wheel center helps stabilize the mounting of the cover, and the securing by the wheel studs safely attaches the cover while still allowing it to be interchangeable with another such cover.

Another feature of the invention is that the cover has at least a portion spaced from the wheel center so that the cover has different surface contours than those of the wheel center.

Therefore, according to the present invention there is provided a wheel assembly comprising a conventional steel wheel and a metal cover. The wheel has a rim with a well, a wheel center joined to the well and supporting the rim, and a central hub aperture surrounded by a plurality of stud holes in the wheel center. The cover extends over the wheel center and has a plurality of stud apertures which register with the stud holes of the wheel center. The outer periphery of the cover extends around the junction between the rim and the well. The cover is spaced from the wheel center between the outer periphery of the cover and the stud apertures of the cover. In use, the cover is clamped to the wheel center by the vehicle's wheel mounting studs and nuts.

Preferably the cover has an outer peripheral lip which is arranged to engage in the junction between the well and the wheel cover. The lip may be curved towards the inboard direction.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
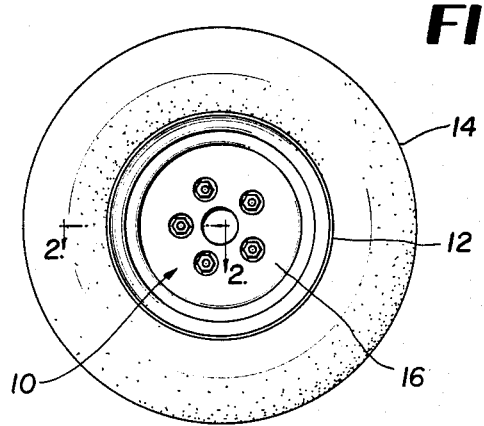
FIG. 1 shows an elevational view of a vehicle wheel according to the invention fitted with a tire and viewed from the outboard side.

FIG. 1 shows the outboard side of an automobile wheel, that is the side facing outwardly from the automobile when the wheel is mounted for use thereon. The wheel, generally designated 10, has a conventional steel rim 12 upon which a tubeless tire 14 is supported. The wheel 10 also has a conventional disc-like steel wheel center 22, or spider, which is completely concealed according to the invention by a decorative cover 16. The wheel 10 is mounted on studs of an axle hub of the vehicle and secured in place by five stud nuts 40.

Figure 2:
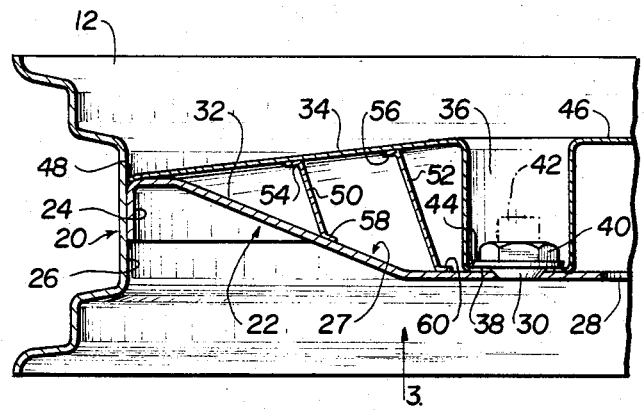
FIG. 2 shows a section on the line 2—2 of FIG. 1 with the tire omitted.

FIG. 2 shows the rim 12 with the usual drop center or well 20. The outer periphery of the wheel center 22 is formed with a cylindrical flange 24 which is rigidly secured by welding to the radially inner surface of the bottom wall 26 of the well 20. The flange 24 is turned inwardly, that is, it extends axially from the periphery of the disc-like wall 27 of the wheel center in the inboard direction. The wheel center 22 has a central aperture 28. Surrounding the central aperture 28 is a circle of five stud holes 30 (only one of which can be seen in FIG. 2). The portion of the wheel center surrounding the aperture 28 and containing the stud holes 30 is annular in configuration as is the portion extending radially inwardly from the peripheral flange 24. A mid-portion 32 of the wheel center connects these two annular portions and has a frusto-conical configuration. In this way, the wheel center is formed concavely on its outboard side, i.e. the upper side of FIG. 2. A thin steel detachable cover 34 extends over the entire outboard side of the wheel center 22 and is attached to the wheel center by the axle studs and nuts when the wheel in mounted on the vehicle. The cover has cylindrical cavities 36 extending axially inwardly from the outboard side in alignment with the stud holes 30. Each cavity 36 has an internal radial flange 38 around the inboard end, and this flange 38 is clamped to the wheel center 22 by each stud nut 40 when that nut 40 is tightened on its respective axle stud 42 (one such stud being indicated in broken lines). Preferably a washer 44 is disposed between the stud nut 40 and the cover flange 38. Alternatively the stud nut 40 may be flanged at its inboard end. The center portion 46 of the cover is continuous and conceals the axle hub which could be visible through central aperture 28. The outer periphery of the cover 34 is slightly turned over in the inboard direction to form a peripheral inturned lip 48 which engages snugly in a small recess defined between the radially inner surface of the tire well 20 and the periphery of the wheel center 22 at the junction therebetween on the outboard side. Two concentric, frustoconical steel bands 50, 52 have outboard flanges 54, 56 welded to the inboard side of the cover 34, and inboard flanges 58, 60 located against the outboard side of the wheel center 22. The bands 50, 52 give the cover 34 greater rigidity and support the main extent of the cover in spaced relationship from the wheel center 22. If desired, the inboard flanges 58, 60 may be secured by adhesive to the wheel center 22, but preferably detachably.

Figure 3:
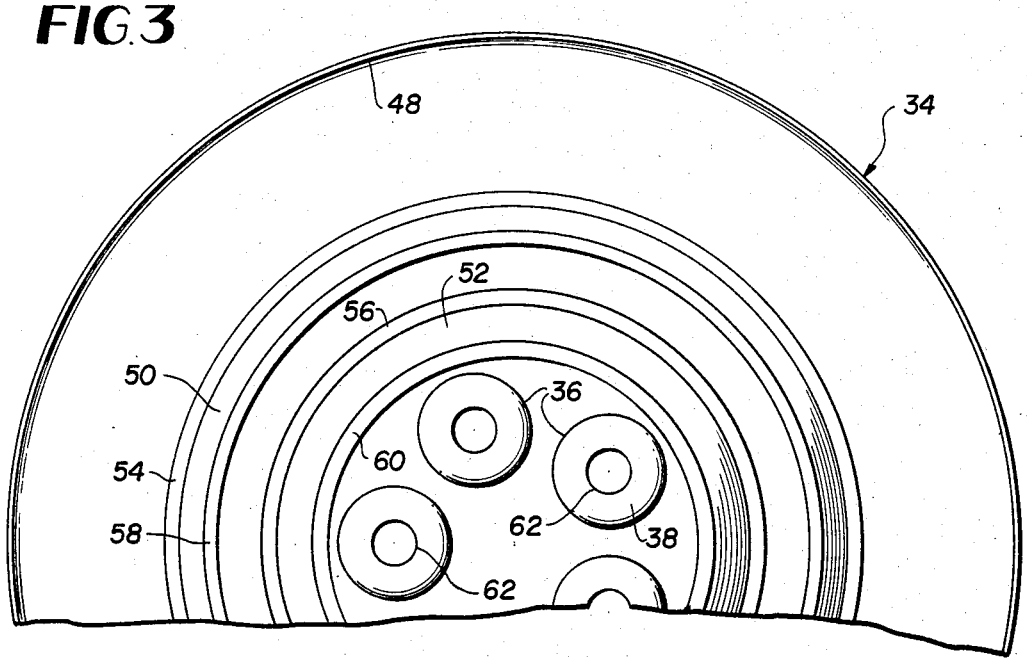
FIG. 3 shows a fragmentary elevational view of the cover only of FIG. 2 viewed from the inboard side in the direction of the arrow 3 in FIG. 2.

FIG. 3 illustrates the inboard side of the cover 34, showing the peripheral lip 48 and the concentric reinforcing bands 50, 52 with the flanges 54, 58 and 56, 60, respectively, of the latter. The outer defining walls of four of the five recesses 36 can be seen. The inboard flange 38 of each recess has a central hole 62 which aligns with the corresponding stud hole 30 (see FIG. 2) in the wheel center.

The cover 34 is made as a stamping or pressing from thin gauge steel, preferably less than 0.015 inch thick, and the outboard surface is chromed. This outboard surface of the cover can be made to any desired contour to produce the decorative effect required. The reinforcing bands 50, 52 enable thinner sheet steel to be employed while still retaining the chosen contours; these bands 50, 52 also help reduce or eliminate noise vibration. Preferably the outboard surface of the tire supporting rim 12 is chromed so that the entire outboard surface of the wheel 10 has an aesethically pleasing chromed appearance.

Preferably, the cover 34 is shaped or pre-stressed so that the peripheral lip 48 engages in the junction between the wall 20 and wheel center flange 24 before the flanges 38 of the recesses 36 contact the wheel center 22 around the stud holes 30, and before the reinforcing bands 50, 52 contact the wheel center 22. Then, when the stud nuts 40 are applied and tightened, the cover is slightly flexed and stressed about the lip 48 to maintain the lip 48 very firmly in place and under pressure against the junction between the rim 12 and wheel center 22. During this stressing the flanges 58, 60 of the bands 50, 52 firmly engage the wheel center 22.

The embodiment shown in FIGS. 4, 5 and 6 will now be described.

Figure 4:
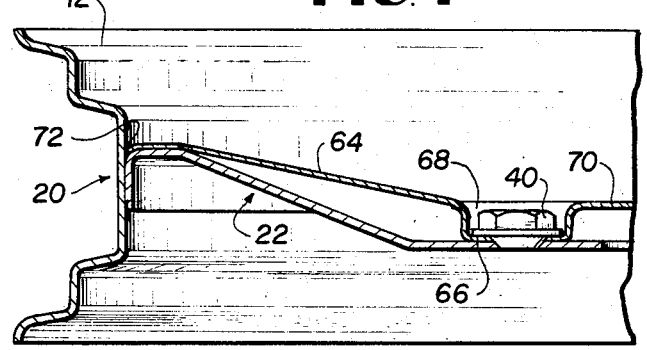
FIG. 4 shows a section similar to FIG. 2 of a second embodiment of the invention.

FIG. 4 is similar to FIG. 2 showing the same steel wheel having the rim 12, with tire well 20, welded to the wheel center 22. A chromed steel stamped cover 64 is attached to the wheel by the vehicle's stud nuts 40 clamping flanges 66 at the bottom of cylindrical recesses 68 against the wheel center 22. The center portion 70 of the cover 64 is again continuous and the outer periphery of the cover is again formed with an inturned lip 72 which engages in the outboard side of the junction between the rim 12 and wheel center 22. However, the cover 64 is generally convex and is contoured to be disposed closer to the wheel center 22. As can be seen, the recesses 68 are considerably shallower than the corresponding recesses 36 in FIG. 2. There are no reinforcing bands or members between the cover 64 and the wheel center 22, and the tightening of the stud nuts 40 firmly clamps the lip 72 in place.

Figure 5:
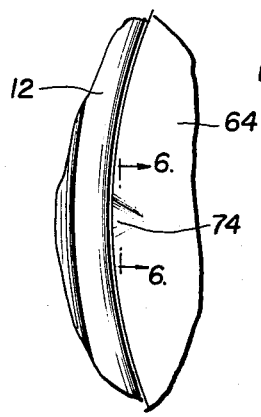
FIG. 5 illustrates a fragmentary perspective view of part of the wheel of FIG. 4 taken from the outboard side, that is from the upper side in FIG. 4.
Figure 6:
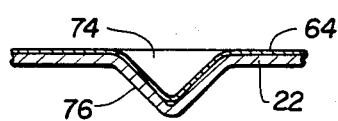
FIG. 6 is an enlarged section on the line 6—6 of FIG. 5 illustrating a detail applicable to any of the embodiments of the invention.

FIG. 5 shows a location depression 74 in the outboard surface of the cover 64. This depression 74 is V-shaped and forms a detent which engages in a corresponding V-shaped depression 76 in the wheel center 22 as shown in FIG. 6. The engaging depressions 74, 76 are located adjacent, but spaced a short distance radially inwardly from, the peripheral lip 72, and serve to locate the cover in its correct angular location relative to the wheel center 22. In this way, the stud holes in the cover 64 and the wheel center 22 can be readily aligned, and the position of the wheel's usual air valve (not shown) relative to the cover 64 is automatically determined.

Another embodiment of the invention shown in FIGS. 7 and 8 will now be described.

Figure 7:
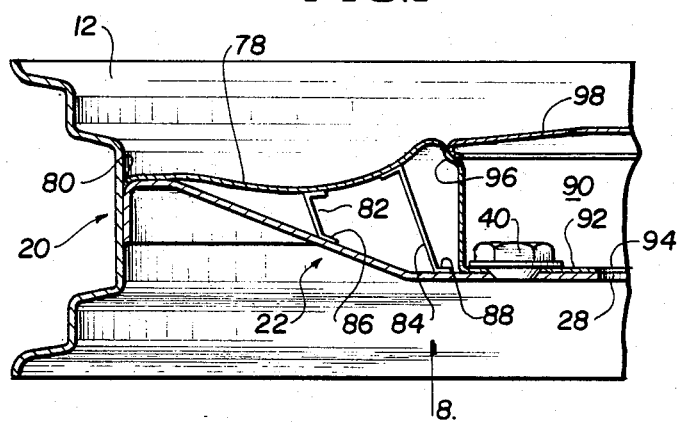
FIG. 7 shows a section similar to FIG. 2 of a third embodiment of a wheel according to the invention.

FIG. 7 is similar to FIGS. 2 and 4 and shows the same steel wheel having the rim 12, well 20, and wheel center 22. Again, a chromed cover 78 is bolted to the wheel center 22 by the tightening of the vehicle's stud nuts 40. During this process, a peripheral lip 80 of the cover 78 is clamped in the outboard junction between the rim 12 and the wheel center 22. Reinforcing struts 82, 84, welded to the cover 78, have inboard flanges 86, 88 pressed against the wheel center 22 to reinforce and stabilize the cover 78. The center of the cover 78 is formed with a large single recess 90 having an inboard annular flange 92 with a central hole 94 which registers with the central aperture 28 of the wheel center 22. The annular flange 92 has a circle of stud holes which register with those of the wheel center. Around the top of the recess 90 is formed a shouldered channel 96 into which a hub cap 98 is a snap fit. The hub cap 98 is chromed sheet steel cap and closes over the central recess 90. The channel 96 and the periphery of the hub cap 98 can be cooperatively formed in any known way to provide a secure removable attachment. The chromed cover 78 is both convexly and concavely contoured to provide the shape and appearance required, and is spaced from the wheel center 22 by the struts 82, 84.

Figure 8:
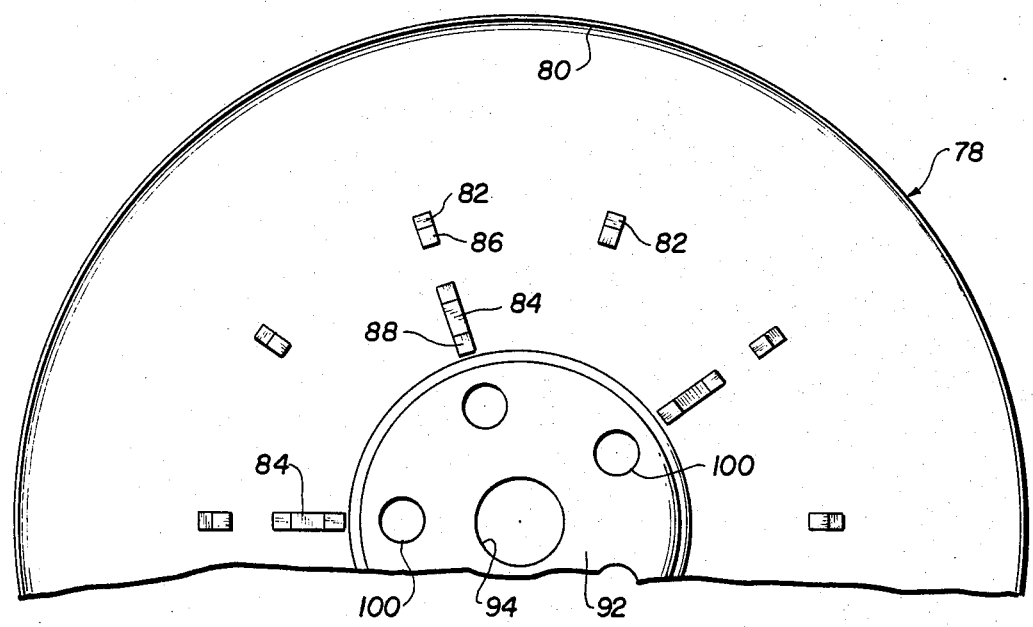
FIG. 8 shows a fragmentary elevational view of the cover only of FIG. 7 viewed from the inboard side in the direction of the arrow 8 in FIG. 7.

FIG. 8 illustrates the inboard side of the cover 78 showing the peripheral lip 80, the struts 82, 84, the channel 96, the annular flange 92 and the central hole 94. Three of the five stud holes 100 in the annular flange 92 can be seen. There are five struts 84 (three of which can be seen) arranged radially in a circle, each being radially outwardly of a stud hole 100. There are ten outer struts 82 (six of which can be seen) equispaced and arranged radially in a circle. The struts 86, 88 may be made of spring steel and resiliently press against the wheel center 22. The recess and detent feature of FIGS. 5 and 6 may be employed in this embodiment, and similarly may also be employed in the embodiment of FIGS. 2 and 3.

The above embodiments illustrate how the cover can be differently contoured to provide different wheel appearances. By omitting reinforcing bands and/or struts, or by choosing the location of such bands and/or struts, the contour of the cover can be spaced further from or closer to the disc-like wall of the wheel center. The appearance can be further varied by the inclusion of a hup cap concealing the studs and nuts, or by exposing the wheel mounting studs and nuts in recesses. Although the cover is preferably chrome plated, other surface finishes such as polishing, painting etc. can be employed to obtain any desired appearance.

It will be appreciated that although the cover may be termed a loose cover, it is securely held in position in use by the stud nuts of the automobile or other vehicle upon which it is mounted. If desired, in particular circumstances, the peripheral lip of the cover could be formed to be a press fit over the outer periphery of the wheel center.

Thus, the present invention provides a nearly inexhaustible design potential to provide a wheel with any desired appearance while using a standard, inexpensive, steel wheel. The outboard surface of the rim can be chromed or painted depending upon this appearance while the wheel center can be left appearance-wise unfinished, possibly a rust preventive treatment being desirable. To provide a multitude of different appearing wheels, the manufacturer only has to use a standard steel wheel together with a range of inexpensive covers in different shapes and finishes. The covers do not have to be applied to the wheels until the wheels are mounted on a vehicle, so providing maximum flexibility of wheel appearance with minimum stocking of wheels by the manufacturer or supplier. Further, a set of wheels could be supplied with two or more different sets of covers; the vehicle owner can then readily change the appearance of his or her vehicle by changing from one style or wheel cover to another.

The center 22 of the wheel has been described as disc-like. Of course, it is not so limited, virtually any standard steel wheel can be used with the invention.

The above described embodiments, of course, are not to be construed as limiting the breadth of the present invention. Modifications, and other alternative constructions, will be apparent which are within the spirit of the invention and scope of the appended claims.

What is claimed is:

1. A wheel for a vehicle, comprising:
    a steel wheel center having an outboard side and an inboard side, and having a central hub aperture surrounded by mounting stud holes;
    a steel rim having a central well adapted for supporting a tire, said rim surrounding and being secured to said wheel center;
    a sheet steel cover located over the outboard side of the wheel center only, and having stud apertures therein registering with said wheel center stud holes, whereby said cover is clamped to said wheel center in use by the hub studs and nuts by which the wheel is mounted on the vehicle;
    said cover having an outer peripheral lip which extends into an outboard junction between said rim and said wheel center and engages the wheel at said junction; and
    at least a portion of said cover between said peripheral lip and said stud apertures being spaced away from said wheel center, whereby said cover has a different contour than that of said wheel center.

2. The wheel of claim 1, wherein said cover is prestressed and shaped so that said lip engages said outboard junction while said stud apertures are spaced from said wheel center stud holes, whereby the clamping of said cover to said wheel center by the hub studs and nuts flexes said cover and clamps said lip against said outboard junction.

3. The wheel of claim 1, further comprising means, secured to the inboard side of said portion of said cover and extending therefrom, for reinforcing said cover, said reinforcing means engaging said wheel center when said cover is clamped to said wheel center by said hub studs and nuts and bridging the space between said cover and said wheel center.

4. The wheel of claim 3, wherein said reinforcing means comprises a frusto-conical band concentric with said central aperture.

5. The wheel of claim 3, wherein said reinforcing means comprises two, radially spaced apart bands concentric with said central aperture.

6. The wheel of claim 3, wherein said reinforcing means comprises a plurality of struts.

7. The wheel of claim 1, wherein said cover and said wheel center have a cooperating detent and depression which register to orientate said cover relative to said wheel center.

8. The wheel of claim 1, wherein said cover has recesses therein extending from the outboard side and terminating in flanges on the inboard side, said stud apertures being formed in said flanges.

9. The wheel of claim 8, further comprising washers in said recesses and supported by said flanges.

10. The wheel of claim 8, wherein said cover has a continuous center portion radially inward of said recesses, said center portion concealing the vehicle's hub when the wheel is mounted thereon.

11. The wheel of claim 1, wherein said cover has a large central recess extending in the inboard direction and terminating with a radially inwardly extending flange, said stud apertures being located in said flange, and said inwardly extending flange having a central opening registering with said central hub aperture.

12. The wheel of claim 11, further comprising a detachable hub cap closing over the outboard end of said central recess.

13. The wheel of claim 1, wherein said wheel center has a flange around the outer periphery thereof, said flange extending in the inboard direction and being welded to said rim, and said lip is curved towards the inboard direction and engages in the outboard junction between said flange and said rim.

14. The wheel of claim 1, wherein said cover and said rim are both chrome plated.

15. A wheel assembly for a vehicle, comprising:
a conventional steel wheel having a rim with a well, a wheel center joined to said well and supporting said rim, said wheel center having a central hub aperture surrounded by a plurality of stud holes for mounting the wheel on the studs of a vehicle axle hub;
a metal cover extending over said wheel center only and having a plurality of stud apertures therein which register with said stud holes of said wheel center;
the outer periphery of said cover extending around and into the junction between said wheel center and said rim and engaging the wheel at said junction; and
said cover being spaced from said wheel center between said outer periphery of the cover and said stud apertures of the cover, whereby said cover is clamped to said wheel center in use by the studs and nuts by which the wheel is mounted on the vehicle.

16. The wheel assembly of claim 15, further comprising reinforcing elements attached to the inboard side of said cover and engaging said wheel center, said reinforcing elements bridging the space between said cover and said wheel center.

17. The wheel assembly of claim 15, wherein said stud apertures are located in cylindrical recesses in said cover to enable said cover to be spaced from said wheel center in the vicinity of said stud apertures.

18. The wheel assembly of claim 15, wherein said outer periphery of said cover is formed as a lip curved away from the outboard side, and the outboard surface of said cover is shaped to have both convex and concave contours in a portion between said lip and said stud apertures.

* * * * *